(12) United States Patent
Bland

(10) Patent No.: US 9,919,464 B2
(45) Date of Patent: Mar. 20, 2018

(54) ARTICLE, PROCESS AND ASSEMBLY FOR FORMING A RIGID ARTICLE ENCAPSULATING AN ORIENTED GLASS STRAND SUBSTRATE

(71) Applicant: U.S. Farathane Corporation, Auburn Hills, MI (US)

(72) Inventor: Wayne Bland, Fort Gratiot, MI (US)

(73) Assignee: U.S. Farathane Corporation, Auburn Hills, MI (US)

(*) Notice: Subject to any disclaimer, the term of this patent is extended or adjusted under 35 U.S.C. 154(b) by 0 days.

(21) Appl. No.: 15/456,904

(22) Filed: Mar. 13, 2017

(65) Prior Publication Data

US 2017/0259477 A1 Sep. 14, 2017

Related U.S. Application Data

(60) Provisional application No. 62/307,154, filed on Mar. 11, 2016.

(51) Int. Cl.
| | |
|---|---|
| *B29C 45/14* | (2006.01) |
| *B29C 45/16* | (2006.01) |
| *B29C 45/26* | (2006.01) |
| *B29K 23/00* | (2006.01) |
| *B29K 77/00* | (2006.01) |

(52) U.S. Cl.
CPC .... *B29C 45/1628* (2013.01); *B29C 45/14631* (2013.01); *B29C 45/2681* (2013.01); *B29K 2023/12* (2013.01); *B29K 2077/00* (2013.01)

(58) Field of Classification Search
CPC .......... B29C 45/1628; B29C 45/14631; B29C 45/2681; B29K 2077/00; B29K 2023/12
See application file for complete search history.

(56) References Cited

U.S. PATENT DOCUMENTS

| | | | | |
|---|---|---|---|---|
| 2,377,393 | A * | 6/1945 | Wiley | B29C 45/14 229/5.81 |
| 5,580,646 | A | 12/1996 | Jansz et al. | |
| 6,004,650 | A | 12/1999 | Schweizer et al. | |
| 6,036,908 | A * | 3/2000 | Nishida | B29C 45/1671 264/254 |
| 2002/0052440 | A1 | 5/2002 | Tochioka et al. | |
| 2002/0156176 | A1 | 10/2002 | Saito et al. | |
| 2007/0152380 | A1 * | 7/2007 | Muller | B29C 45/045 264/516 |
| 2012/0190785 | A1 | 7/2012 | Ban et al. | |

* cited by examiner

*Primary Examiner* — Galen H Hauth
(74) *Attorney, Agent, or Firm* — Dinsmore & Shohl LLP

(57) ABSTRACT

A process and assembly for producing a two stage injection molded article encapsulating an oriented glass strand mat substrate. A rotary press is incorporated into the injection mold assembly and which enables repetitive repositioning of an intermediate injection molded article into a second mold defining cavity for second stage molding and simultaneous with first stage molding of a subsequent glass strand composite positioned within the first mold cavity.

3 Claims, 11 Drawing Sheets

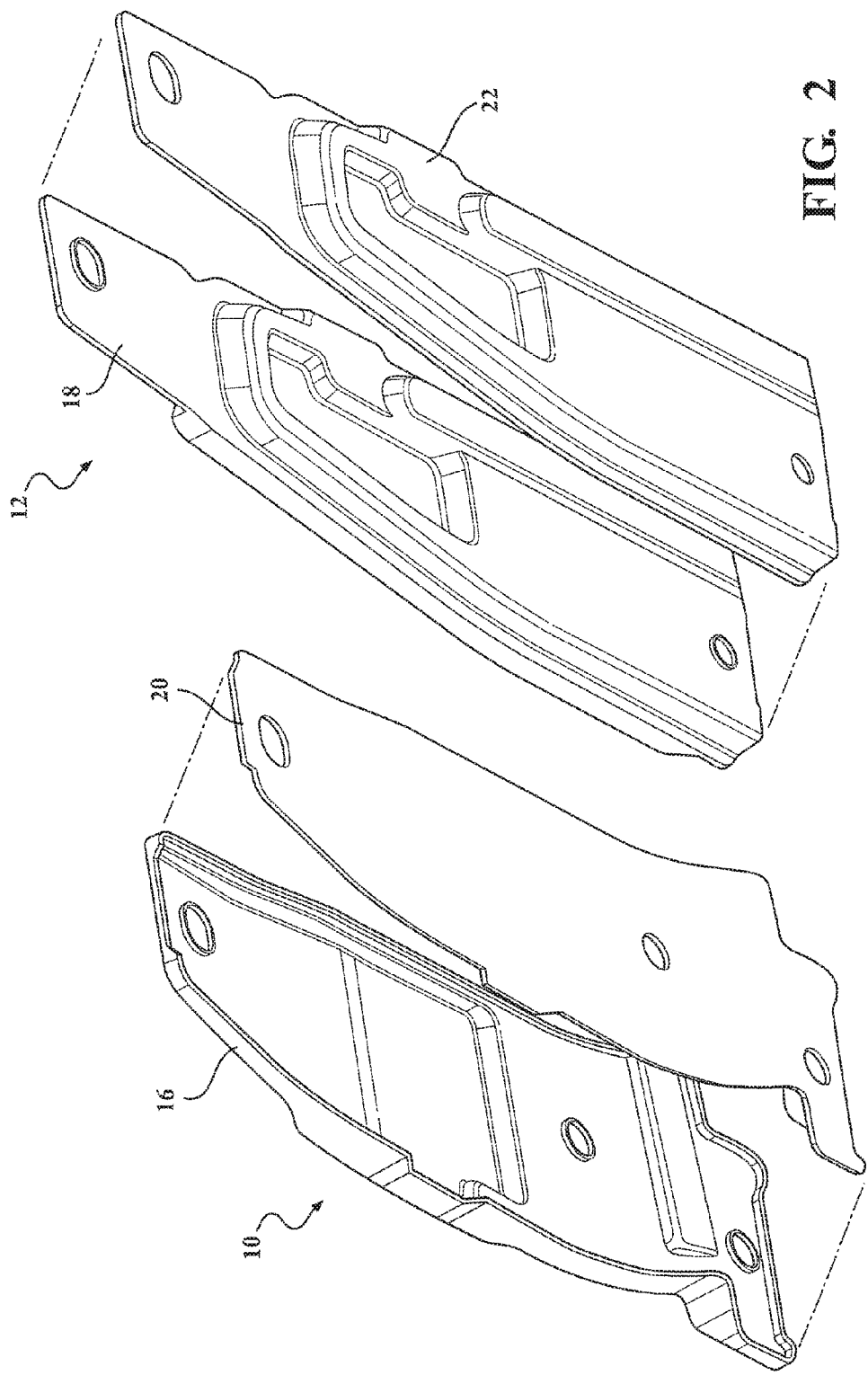

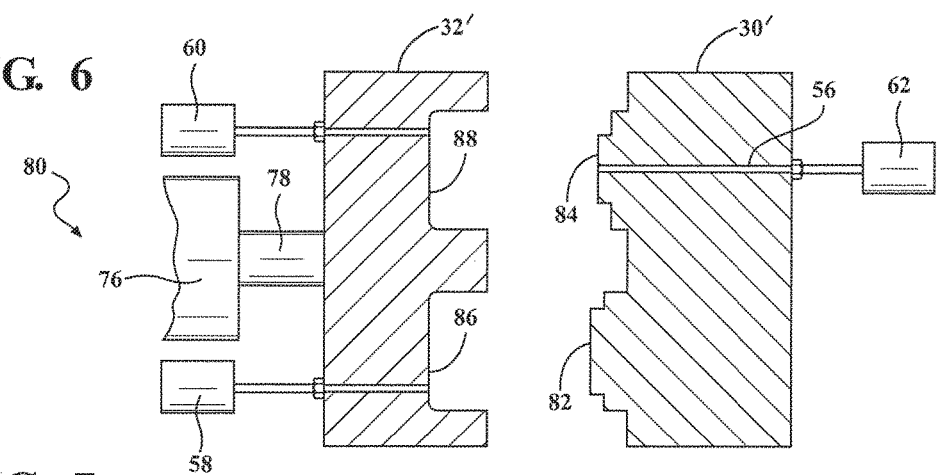
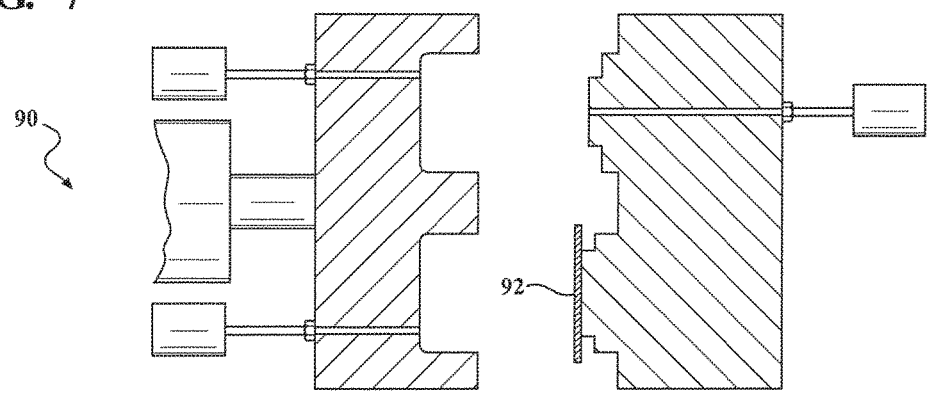
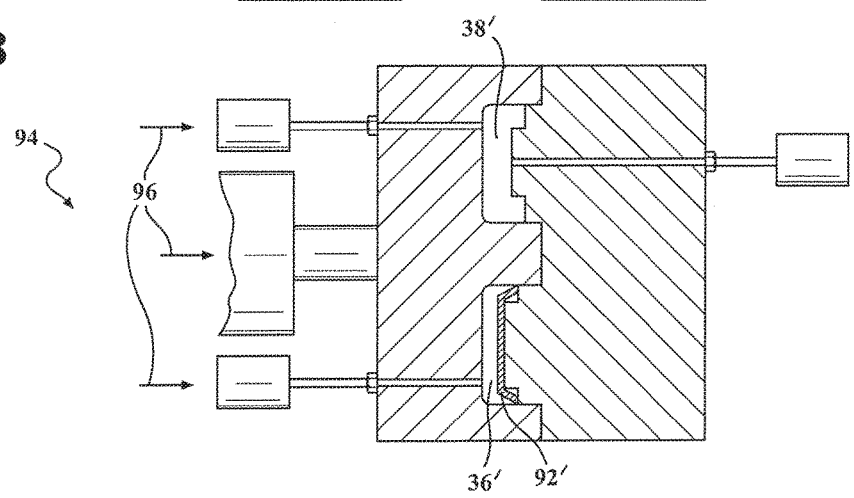

ARTICLE, PROCESS AND ASSEMBLY FOR FORMING A RIGID ARTICLE ENCAPSULATING AN ORIENTED GLASS STRAND SUBSTRATE

CROSS REFERENCE TO RELATED APPLICATIONS

This Application claims the benefit of U.S. Provisional Application 62/307,154 filed on Mar. 11, 2016, the contents of which is incorporated herein in its entirety.

FIELD OF THE INVENTION

The present invention relates generally to the formation of rigid plasticized articles, such as which can be integrated into vehicular or other applications. More specifically, the present invention discloses an article, assembly and method for producing a rigid thermoplastic article integrating a plurality of elongated and oriented glass strands (defined to include any of fiberglass, carbon fiber, Kevlar, etc.). Applications of the invention also envision any of single or dual stage injection molding operations (including rotary die slide or other variants) as well as other potential applications not limited to elongated extruded articles in which the oriented glass strand substrate is passed through a cross head die concurrent with the introduction of a suitable extruded material in encapsulating fashion thereabout.

BACKGROUND OF THE RELEVANT ART

The prior art is documented with examples of molding assemblies, such as which can integrate various types of glass fibers into the produced part for purposes of providing additional strength and rigidity. This is particularly of value in the production of such as thinner parts integrated into vehicle applications.

US 2002/0052440, to Tochioka et al., teaches a long glass fiber filler reinforced resin material for molding includes a matrix polymer comprising a polypropylene component having a pentad isotactic index of at least 95%, and having a melt flow rate (JIS K7210, a temperature of 230° C.; and a load of 21.18N) of 100 to 300 g/10 min; a long glass fiber filler in a content of 30 to 50 mass percent with respect to a total mass; an affinity providing component for providing affinity between the matrix polymer and the long glass fiber filler. At least the matrix polymer and the long glass fiber filler form a composite. Thus, breakage of the long glass fiber filler is suppressed during molding processing, so that a molded article having a high bending modulus and a high impact strength can be molded.

US 2002/0156176 to Saito et al. discloses a long fiber-reinforced polypropylene resin composition for a molded article which is improved in all of a mechanical strength, a rigidity and an impact resistance and excellent as well in a durability, in which the long fiber-reinforced polypropylene resin composition comprises a long fiber-reinforced propylene polymer composition comprising a propylene polymer modified with unsaturated carboxylic acid or an anhydride thereof and having an isotactic pentad ratio of 96% or more and a melt flow rate of 100 to 500 g/10 min, an alkaline earth metal compound, and a glass fiber; and a propylene-ethylene copolymer composition comprising a propylene-ethylene copolymer having a melt flow rate of 10 to 60 g/10 min and a nucleating agent.

U.S. Pat. No. 6,004,650, to Schweizer et al., teaches a method for making a composite part including the steps of providing continuous reinforcing fiber strand material, providing a mold having an inner cavity, placing the continuous strand material in the mold cavity, providing a composite material containing discontinuous reinforcing fibers, adding the composite material to the mold cavity and molding a composite part from the composite material and the strand material such that the part is reinforced by continuous and discontinuous reinforcing fibers.

U.S. Pat. No. 5,580,646, to Jansz et al., discloses a glass mat reinforced thermoplastic semi-finished sheet material and associated method for producing including a thermoplastic resin and at least two needled continuous and/or chopped glass fibre strand mats. Each of the glass mats is needled from the two sides in an asymmetrical way, so that the number of fibre ends protruding from the two major mat surfaces are practically the same, but the length of said fibre ends protruding from the first major surface is substantially longer than the length of the fibre ends protruding from the second opposite major surface. The glass mats are impregnated with thermoplastic resin, having either their first major surfaces directed towards the outside surface of the thermoplastic sheet, for maximum mouldability, or having their second major surfaces directed towards the outside surface of the thermoplastic sheet, for maximum surface quality of the moulded part.

Finally, Ban 2012/0190785 teaches a long glass reinforced resin composite including two kinds of thermoplastic matrix resin (a1, a2) which have different viscosities and a long glass fiber (B). A method of preparing the long glass reinforced resin composite includes preparing a LFT (Long fiber thermoplastic) master-batch composition by impregnating the long glass fiber (B) of continuous phase into the low viscosity thermoplastic resin (a2), and compounding the LFT (Long fiber thermoplastic) master-hatch composition with high viscosity thermoplastic resin to produce a composite having excellent mechanical properties such as impact strength, tensile strength, and flexural modulus.

SUMMARY OF THE INVENTION

The present invention discloses an article, assembly and method for producing a rigid thermoplastic article in a two stage rotary injection molding operation, the article integrating a plurality of elongated and oriented glass strands. In a first injection molding application, a matrix (or mat) of the oriented glass strands (also interpreted to include any of fiberglass, carbon fiber, Kevlar, etc) is pre-positioned in suspended fashion within an interior mold defined cavity.

A first amount of a polymer material (including any of a thermoplastic resin ranging from nylon to polypropylene) is injected into the mold cavity into contact with the pre-positioned oriented mat, following which the part and/or mold is rotated to a second position, following which a second shot of like material is applied against the other side of the matrix, with the polymers bonding to each other in order to encapsulate the oriented glass strands therebetween. The inserted matrix conforms to the cavity profile and geometry while creating a cohesive or adhesive bond to the injected thermoplastic.

In this fashion, a much lighter and more rigid part is accomplished as compared to the prior art methods and articles which seek to produce a similar part using random (chopped) fiber strands within the matrix. This is due to the oriented stand fibers encapsulated and impregnated with the thermoplastic resin in order to produce a steel-like tensile strength at reduced weight and cost. Variants include integrating either single or two stage injection molding operations in use with the oriented glass strand matrix, such further contemplating use of rotary die slide or other transfer mechanisms for efficiently repositioning the mold between successive injection molding operations.

BRIEF DESCRIPTION OF THE DRAWINGS

Reference will now be made to the attached drawings, when read in combination with the following detailed description, wherein like reference numerals refer to like parts throughout the several views, and in which:

FIG. 2 is an exploded illustration of the individual pair of splash shields and depicting a first thermoplastic layer and a second mating molded glass mat layer according to one non limiting variant;

FIG. 6 is a general representation in cutaway profile of a dual cavity injection molding operation again depicting an empty mold open condition with a moveable platen opposing a stationary platen;

FIG. 7 is a succeeding illustration to FIG. 6 illustrating the elongated and oriented glass strand composite loaded onto the stationary platen first cavity surface;

FIG. 8 succeeds FIG. 7 and depicts the mold closed (loaded) by advancing the moveable platen into contact with the stationary platen in order to define both the first and second cavities, the oriented glass strand composite depicted in a captured and pre-first stage injection molding condition within the first cavity;

DETAILED DESCRIPTION OF THE PREFERRED EMBODIMENTS

As previously described, the present invention discloses an article, assembly and method for producing a rigid thermoplastic article integrating a structurally supporting interior including a plurality of elongated and oriented glass strands. The ability to efficiently and cost-effectively create a thermoplastic article utilizing a mat of elongated/oriented glass strands, and as opposed to chopped fiber strands, provides enhanced tensile strength not previously made possible in the relevant art.

Figure 1:
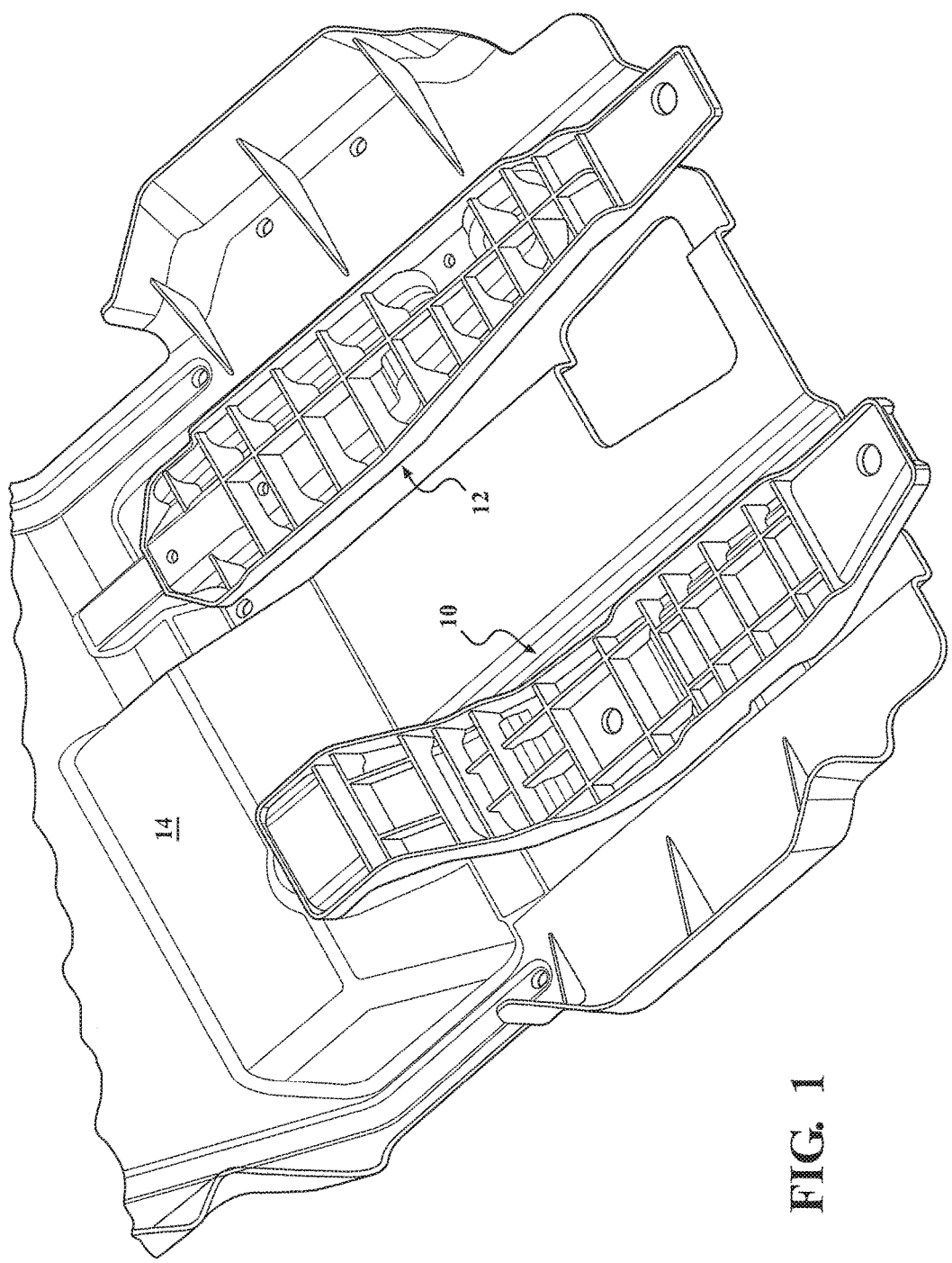
FIG. 1 is an environmental view of a pair of splash shields, see generally at 10 and 12, integrating a reinforced mat of oriented glass fiber strands and which are in turn incorporated into a vehicle panel according to one non-limiting application of the present inventions.

Prior to describing alternate variants of methods (typically two stage injection molding) for producing a thermoplastic article incorporating elongated oriented strands of reinforcing glass (such including a single or dual injection mold operation as in FIGS. 4-5 or an extrusion process as in FIG. 6), an explanation will be made of exemplary articles which can be produced according to the present method. These include the pair of splash shields, see generally at 10 and 12, depicted in the non-limiting variant of FIG. 1. Each of the splash shields 10 and 12 integrates a reinforced mat of oriented glass fiber strands, which are in turn incorporated into a vehicle panel 14 according to one non-limiting application of the present inventions.

Referring further to FIG. 2, an exploded illustration is depicted of the individual pair of splash shields 10 and 12, each including a first thermoplastic layer, at 16 and 18, and a second mating molded glass mat layer, further at 20 and 22, according to one non limiting variant. The glass mat layer can exhibit a minimal thickness as measured in millimeters (mils).

Figure 17:
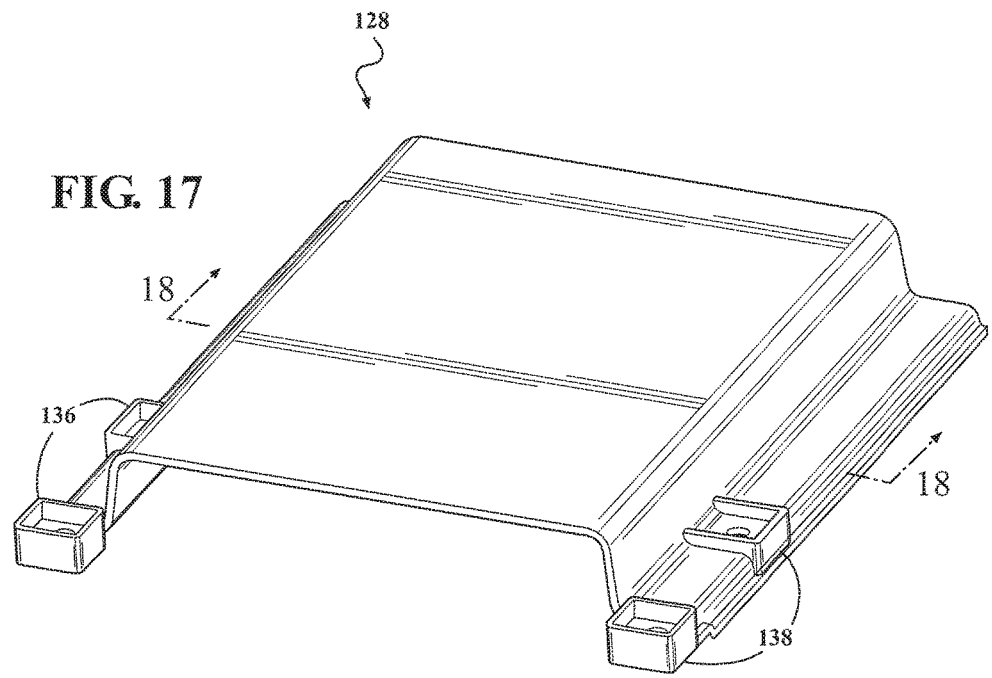
FIG. 17 is an illustration of an example of one non-limiting type of part produced according to the dual stage injection molded assembly and process of the present invention and including such as a PCM (computer) module bracket.
Figure 18:
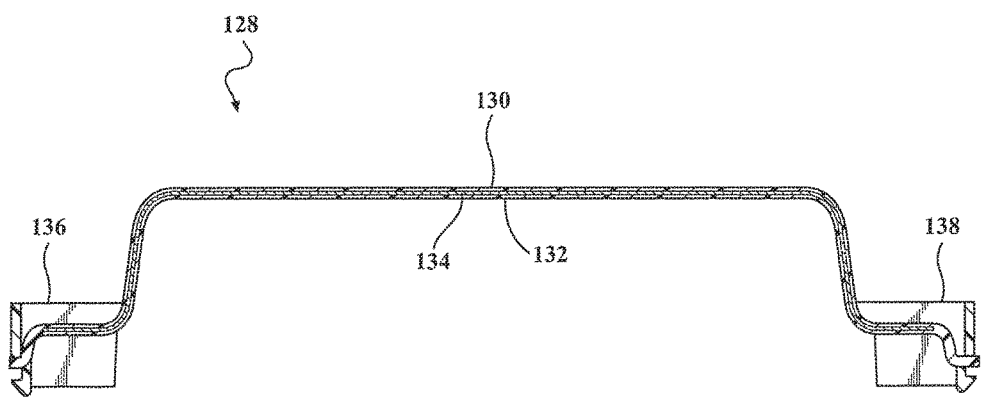
FIG. 18 is an end cutaway of the PCM bracket of FIG. 17 and showing the interior arrangement of the oriented and composite glass strand matrix produced according to the dual stage injection molding process.

As further shown with the additional example of PCM bracket of FIGS. 17-18, the panels shown can exhibit any shape or configuration such as including any elongated or three dimensional molded profile. The in-molded apertures (see aperture defining rims at 24 and 26 in FIG. 3A which reference overlapping locations associated with the individually, or consecutively, formed layers 16 and 20 of the first splash shield 10 in FIG. 2) or other design configurations incorporated into the molding or forming operation for creating the reinforced article, render it suitable for any given structural mounting application. As previously described, the imbedded glass mat of oriented strands (such as produced according to the two stage injection molding process also described herein) provides the panel with exceptional tension load resiliency given the panels overall weight.

Figure 3A:
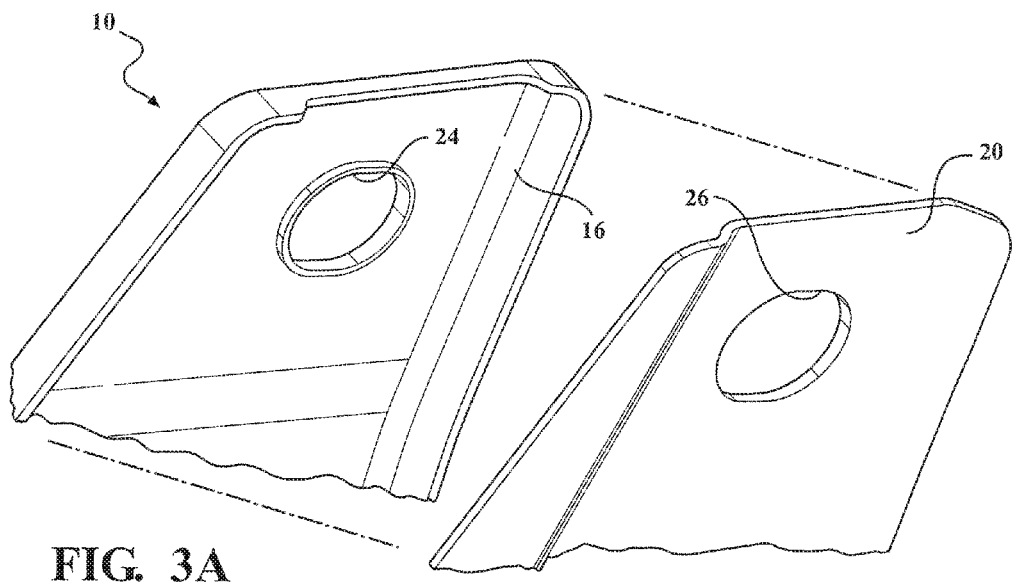
FIGS. 3A and 3B respectively present enlarged exploded and assembled perspectives of the panels in FIG. 2.
Figure 3B:
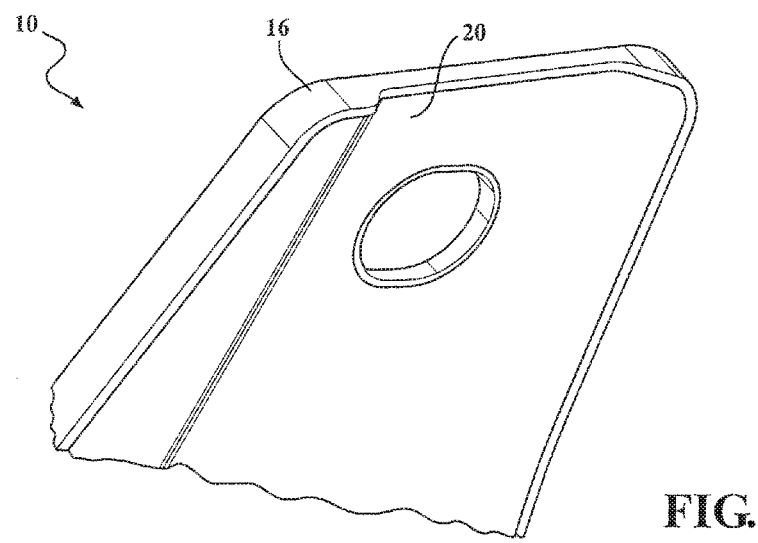

FIGS. 3A and 3B respectively present enlarged exploded and assembled perspectives of a selected one the splash shield panels, at 10, shown in FIG. 2. FIG. 3A depicts an upper end portion of the splash shield thermoplastic 16 and oriented glass strand 20 layers shown in exploded fashion, with FIG. 3B further illustrating the layers 16 and 20 in sandwiched or mating engagement.

As will be described with further reference to FIG. 4 et seq., the individual panel layers 16/18 and 20/22 can be concurrently or successively formed within an injection mold operation. This can also include the molded glass neat 20 and 22 being initially formed with a subset volume of the thermoplastic material, following which the external layer of the thermoplastic material 16 and 18 is formed or bonded to previously formed molded glass mat, such as without limitation according to the two stage injection molding operations described herein. The present inventions also contemplate variations of additional molding or other forming operations in which the previously molded or otherwise formed panels are adhesively bonded to one another in a post molding operation.

Figure 4:
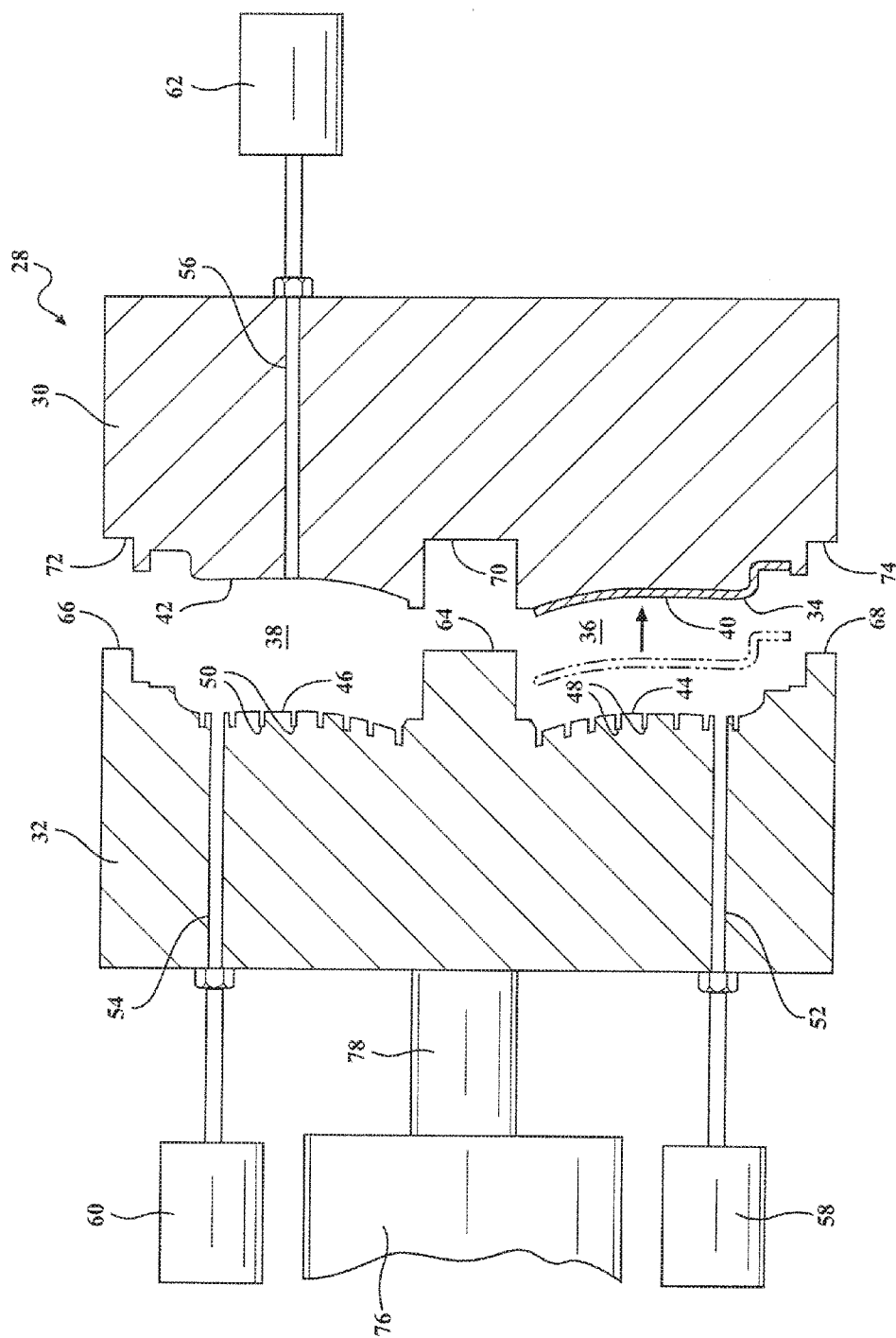
FIG. 4 is a side cutaway view of a dual cavity injection molding operation including both stationary and movable platens and illustrated in a first open configuration in which an elongated oriented glass strand matrix corresponding to a part to be produced is pre-positioned (such as robotically) upon a first cavity interior facing surface of the stationary platen.

With reference to the succeeding illustrations of FIG. 4 et seq, an explanation will now be provided of non-limiting examples of a dual stage injection molding operation for creating a thermoplastic article integrating a matrix (or mat) of the oriented glass strands (also interpreted to include any of fiberglass, carbon fiber, Kevlar, etc) which can be arranged in any composite or other arrangement.

The present invention further includes the ability to injection mold any type of part, including thinner parts in the (3-5 mil range) which exhibit superior strength and resilience. Without limitation, the present invention contemplates the dual stage injection molding of a flowable material not limited to any of a polypropylene, nylon, or thermoplastic elastomer or the like which fully encapsulates the oriented glass strand matrix in order to provide superior strength and resilience. Such parts can further include any of a variety of different types not limited to PCM brackets, vehicle running boards, vehicle floorboard constructions, etc.

FIG. 4 is a side cutaway view of a dual cavity injection molding operation, generally at 28, including both stationary 30 and movable 32 platens and illustrated in a first open configuration in which an elongated oriented glass strand matrix 34 corresponding to a part to be produced is prepositioned (such as robotically by an articulating and servo controlled arm not shown) upon a first cavity interior facing surface of the stationary platen. FIGS. 4-5 collectively depict one example of a pair of stationary and movable platens in open (FIG. 4) and closed (FIG. 5) positions and which collectively define first 36 and second 38 cavities between opposing and cavity defining surfaces (these being shown at 40 and 42 for stationary platen 30 and further at 44 and 46 for movable platen 32). As will be further described with reference to the succeeding two stage injection molding variant of FIGS. 6-16, the movable platen 32 is rotated following a first stage injection molding of the first cavity 36, in order to rotate the carried glass strand matrix 34 and first stage injection molded layer from initial opposition to the first cavity surface 40 of the stationary platen into opposing communication with the second cavity surface 42. In this fashion, the cavity surfaces 44/46 of the movable platen continuously rotate between the first and second cavities established with the stationary platen.

Referring again to FIG. 4, the cavity defining surfaces 40/42 and 44/46 of the stationary and movable platens can exhibit any profile or configuration and which define a negative of a part to be produced. This includes the movable platen cavity surfaces 44/46 further including additional irregular or recess locations 48/50 associated with the part to be produced.

As further shown, each of the movable platen cavity surfaces 44/46, as well as second cavity stationary platen 42, is communicated by a channel (see channel 52 for movable platen cavity surface 44, channel 54 for cavity surface 46, and further channel 56 for stationary platen and second cavity defining surface 42). Each of the channels are further supplied by an injection mold piston or like pressurized flowable delivery mechanism (see at 58, 60 and 62 respectively), such further including a pressurized chamber for delivering a specified volume of the flowable material (polypropylene, etc.) through the respective channels 52, 54 and 56 at discrete injection molding steps.

In this fashion, sequential molding of the article includes a first molding step with the first cavity communicating location of the movable platen, shown in FIG. 4 by delivery chamber 58 communicating with associated channel 52, filling the first side of the glass matrix insert 40. Upon rotating the intermediate or semi-injected molded article into a second cavity closed condition opposing the fixed platen cavity surface 42, the delivery chamber 62 of the stationary platen provides a second stage injection molding operation to the reverse (exposed) face of the glass strand 40 to complete the molding of the article in a manner which encapsulates the glass strand insert. As will also be described, and concurrent with the second stage molding through the stationary platen, the repositioned or rotated movable platen first cavity surface 46 provides first stage injection molding of a subsequently introduced glass strand insert 40.

Figure 5:
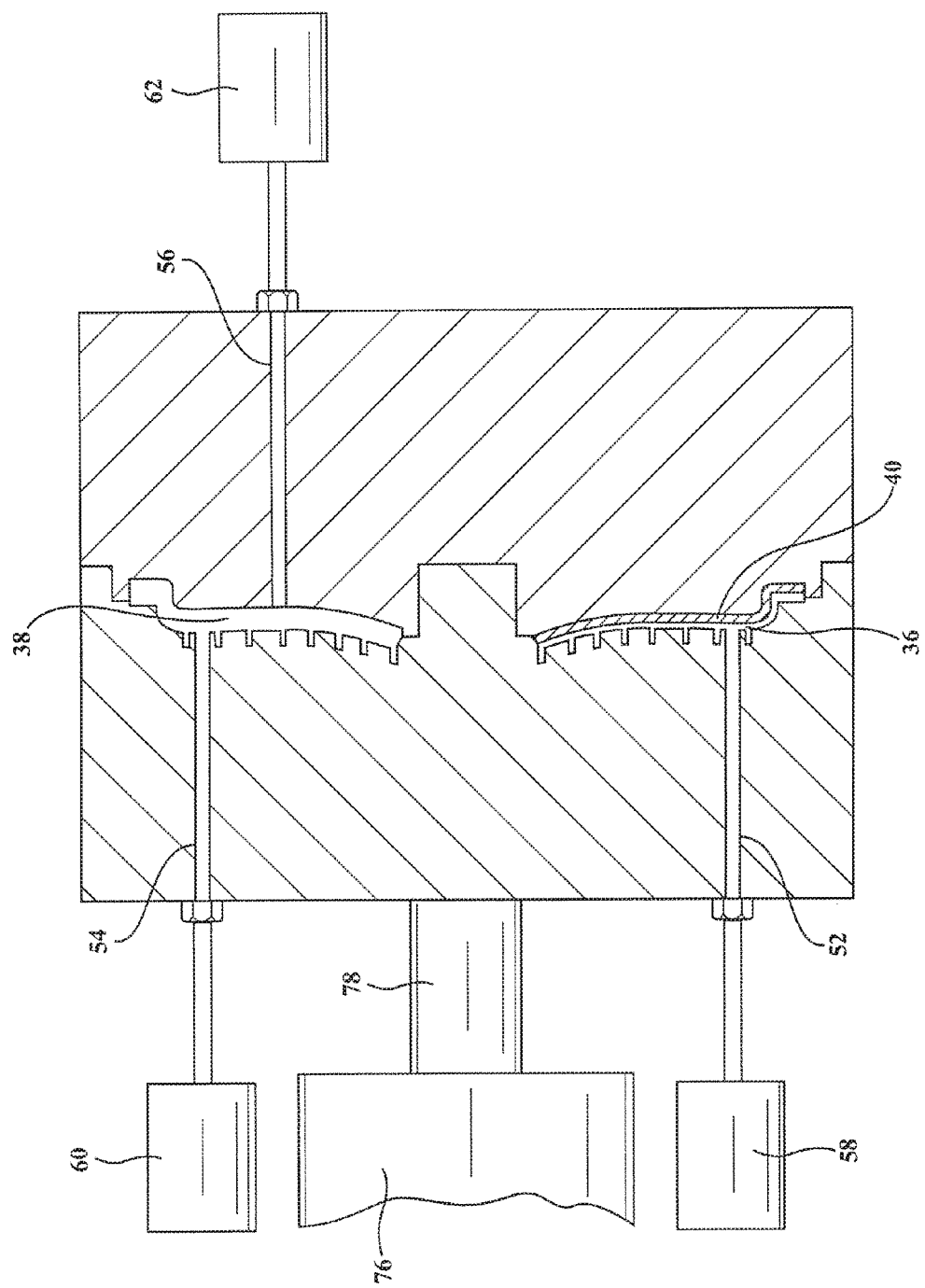
FIG. 5 is a succeeding view to FIG. 4 depicting a closed mold position in which the oriented glass strand matrix is arrayed within the first cavity prior to introduction of a first stage (Shot) injection molding through a communicating passageway extending within the movable platen in communication with the first cavity, an associated second cavity being depicted which is empty prior to a first stage injection molding of the first cavity.

Additional mold features also include opposing projecting portions (see central 64 and outer 66/68) of the movable platen 32 which seat with receiving locations (see central 70 and outer 72/74) associated with the stationary platen in order to properly align the mold cavity defining surfaces between the open and closed positions (again FIG. 5). Without limitation, the opposing platen surfaces can exhibit any pattern or configuration for ensuring accurate and aligned configuration therebetween.

Advancing and retracting of the platens can be provided, in one non-limiting example, through an arrangement of threaded drive screws (see as subsequently shown in FIG. 19) extending between outer supporting locations of the stationary and movable platens. Rotation of the cavity supporting portion of the movable platen can also be provided by a rotary driving assembly 76 with extending shaft 78. As will be further described, the shaft 78 rotates the movable platen 32 in order to successively and consecutively reposition its mold defining cavity surfaces 44/46 between the first and second stage injection molding cavities established with the stationary cavity surfaces 40/42 exhibited by the stationary platen 30. Consistent with the above explanation, FIG. 5 is a succeeding view to FIG. 4, depicting a closed mold position in which the oriented glass strand matrix 40 is arrayed within the first cavity prior to introduction of a first stage (shot) injection molding through the communicating passageway 52 extending within the movable platen 32 in communication with the first cavity, an associated second cavity being depicted which is empty prior to a first stage injection molding of the first cavity.

Referring to FIG. 6, a general representation is shown at 80 in cutaway profile of a dual cavity injection molding operation again depicting an empty mold open condition with a moveable platen at 32' opposing a stationary platen 30'. The features of the mold assembly in each of FIGS. 6-16 largely mirror those described in FIGS. 4-5 such that identical features will not be repetitively described. That said, it is further noted that the opposing projecting and receiving locations of the stationary/movable platens, along with the first and second cavity defining surfaces (at 82/84 for stationary platen 30') and the corresponding opposing and rotatable surfaces (at 86/88 associated with the movable platen 32') are configured somewhat differently from that shown in FIGS. 4-5 with the understanding that such can be modified in order to accommodate the dual stage injection molding of any desired part. To this end, it is understood that the platens can be readily interchangeable, with additional variants contemplating each platen exhibiting any type of insert or other attachable portion (not shown) in order to reconfigure the negative cavity as desired in the production of an eventual part incorporating a glass strand insert.

FIG. 7 is a succeeding illustration to FIG. 6, at 90, and illustrating the elongated and oriented glass strand composite, shown in a further configuration at 92 loaded onto the stationary platen first cavity surface (see at 82 in FIG. 6). As previously described, the mat layer can exhibit any thread density or consistency of oriented strands, such including a minimal thickness mat of 1 mm or more and it is farther envisioned and understood that the glass oriented strands can be pre-coated or molded as a composite material prior to being loaded within the first stage injection molding cavity (this providing additional structural integrity to the glass strand composite 40).

Without limitation, the oriented strand matrix can be supported across the extending interior of the closed mold by tensioning of the matrix along the outer perimeter mating edges of the mold halves (such as pinching between the opposing faces at the outer mold edges). Another option of supporting the strand matrix pre-injection is to utilize sacrificial or removable gripping portions (not shown) which can be propositioned about the interior perimeter of the mating cavity in order to reliably support and maintain the oriented strand matrix in suspended fashion during the forces attended to in-filling of the pressurized thermoplastic fluid.

FIG. 8 succeeds FIG. 7 and depicts, at 94, the mold closed (loaded) by advancing the moveable platen (see directional arrows 96) into contact with the stationary platen in order to define both the first and second cavities (see at 36' and 38' which vary from those shown at 36/38 in FIG. 5). The oriented glass strand composite is further depicted in a captured and pre-first stage injection molding condition (see slightly deformed at 92') within the first cavity. As previously described, the composite 92' can be provided in either of preconfigured/rigid or deformable conditions in order to adapt to a correct configuration when placed within the mold cavity.

Figure 9:
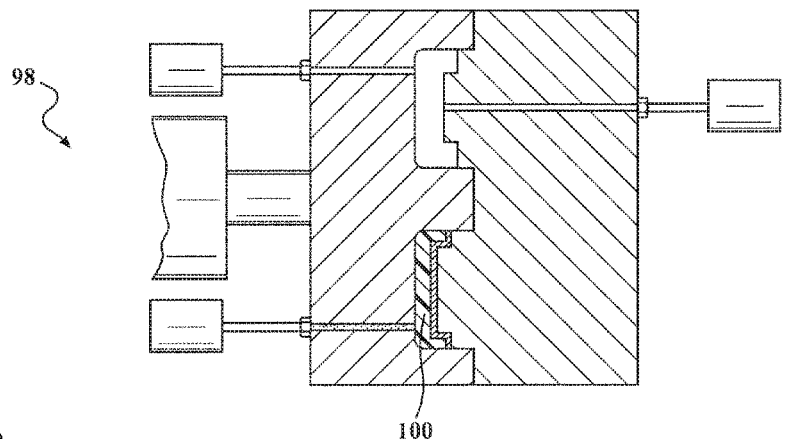
FIG. 9 further depicts a first stage (first shot) injection molding of a material through the movable platen and into the first cavity in order to fill the open interior and to bond to the exposed surface of the glass strand composite.

FIG. 9 further depicts, at 98, a first stage (first shot) injection molding of a material 100 through the movable platen 32' and into the first cavity 36' in order to fill the open interior and to bond to the exposed surface of the glass strand composite 92' (see upper and lower ends of the composite being further deflected into contact with the outer defining edge walls of the first cavity in response to the pressing forces of the first material injection molding step and by which the first amount of a polymer material 100 (including any of a thermoplastic resin ranging from nylon to polypropylene) is injected into the mold cavity into contact with the pre-positioned oriented mat or composite. Depending upon the spacing or weave density of the oriented strands in the mat (as well as to whether a plasticized material is pre-applied to the glass mat prior to injection molding), a degree of bleed through or permeation of the thermoplastic through the weave strand is typically attendant during the initial injection molding stage. It is further envisioned and understood that a pre-composite version of a glass strand insert can include a compression molded article integrating a specified volume of composite flowable material interstitially formed with the glass strand matrix.

Figure 10:
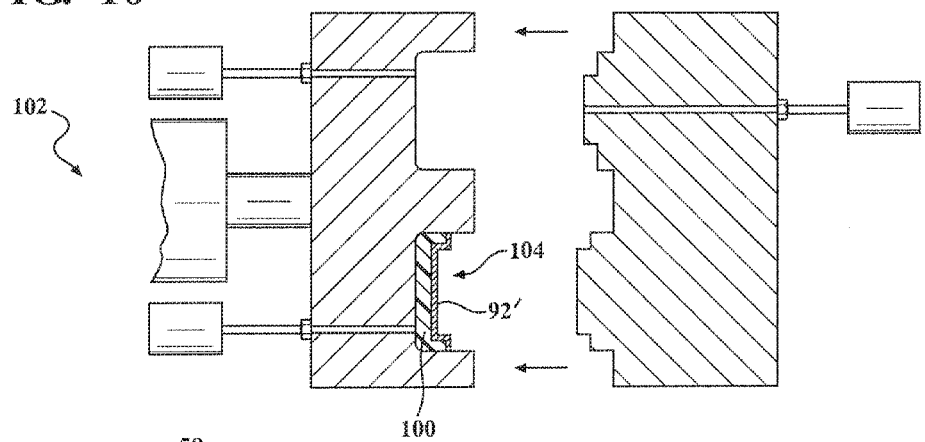
FIG. 10 is mold re-open configuration in which the first shot semi-injection molded article is carried upon the opposing first cavity surface of the movable platen.
Figure 11:
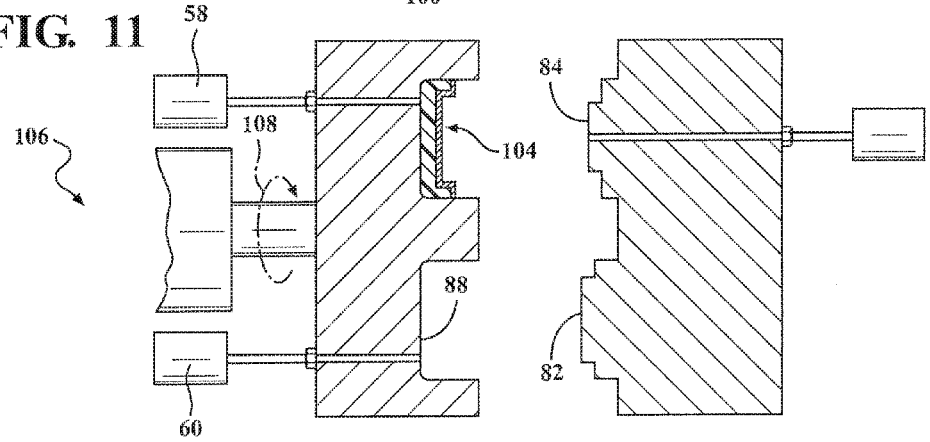
FIG. 11 illustrates a succeeding rotation of the moveable platen, in which the semi-injection molded article is repositioned into opposition with the second cavity defining surface of the stationary platen, thereby reclassifying the first cavity surface of the movable platen as now being a second cavity defining surface, with the formerly second cavity surface of the movable platen now being a first cavity defining surface.

FIG. 10 is mold re-open configuration, at 102, in which the first shot semi-injection molded article, at 104, is carried upon the opposing first cavity surface (at 86 as in FIG. 6) of the movable platen 32'. FIG. 11 illustrates, at 106, a succeeding rotation of the moveable platen 32' (see arrow 108), in which the semi-injection molded article 104 is repositioned into opposition with the second cavity defining surface 84 of the stationary platen, thereby reclassifying the first cavity surface 86 of the movable platen as now being a second cavity defining surface, with the formerly second cavity surface 88 of the movable platen now being a first cavity defining surface.

Figure 12:
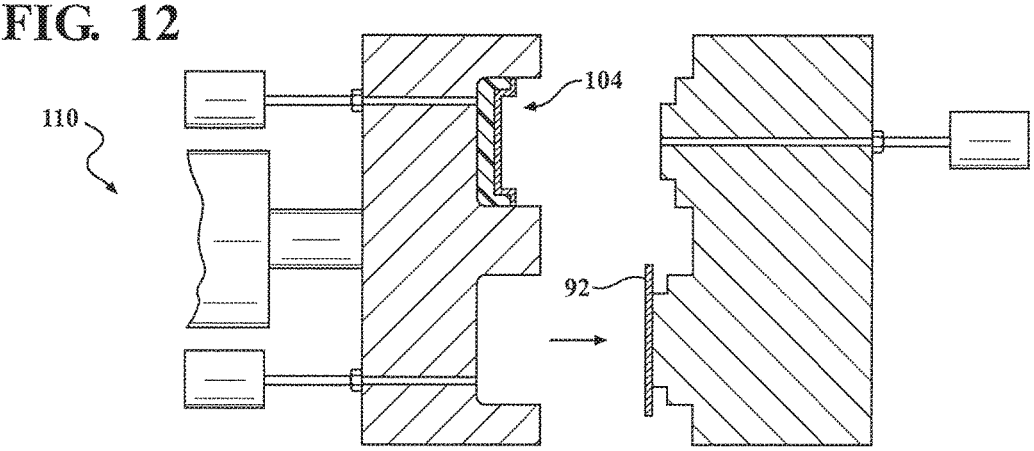
FIG. 12 is a succeeding illustration to FIG. 11 and in which a second composite oriented glass strand substrate is loaded upon the stationary platen first cavity defining surface.
Figure 13:
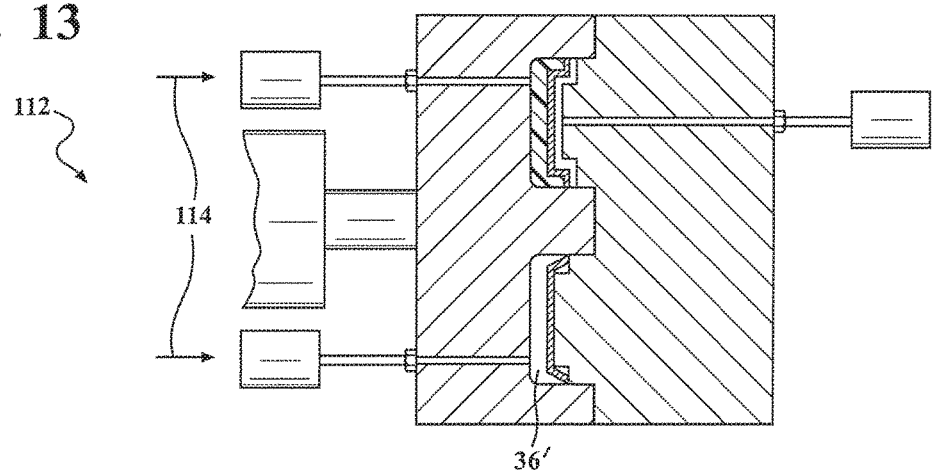
FIG. 13 is a succeeding and re-closing mold configuration in which the semi-injection molded article is captured within the second mold cavity, with the first mold cavity replicating the configuration of FIG. 8.

FIG. 12 is a succeeding illustration, at 110, to FIG. 11 and in which a second composite oriented glass strand substrate (shown at 92 and identical to that depicted in FIG. 7) is loaded upon the stationary platen first cavity 82 defining surface. FIG. 13 illustrates, at 112, a succeeding re-closing mold configuration (see directional arrows 114 indicating advancing of the movable platen 32' by linear ram or displacement components) in which the semi-injection molded article 104 is captured within the second mold cavity, with the first mold cavity replicating the configuration of FIG. 8.

Figure 14:
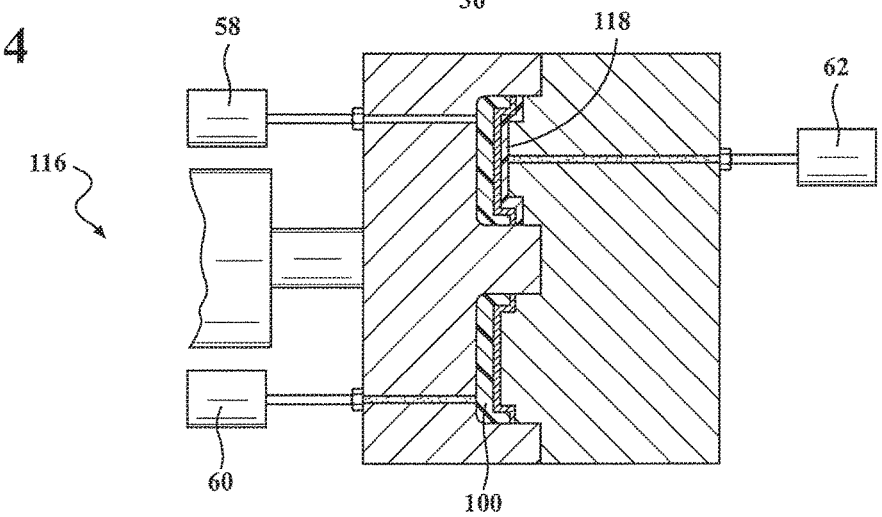
FIG. 14 is a further succeeding illustration in which a first shot injection molding operation is repeated within the first cavity as described in FIG. 9 to cover the exposed surface of the further loaded composite glass strand, with a second shot injection molding operation concurrently occurring in the second cavity by introduction of an additional volume of a flowable material through the stationary platen and into the second cavity in order to cover an opposite surface of the glass strand composite and in order to fully encapsulate the composite within the injection molded part.

FIG. 14 is a further succeeding illustration, at 116, in which a first shot injection molding operation is repeated within the first cavity as described in FIG. 9 to cover the exposed surface of the further loaded composite glass strand 92', with a second shot injection molding operation concurrently occurring in the second cavity by introduction of an additional volume of a flowable material 118 through the stationary platen and into the second cavity in order to cover an opposite surface of the glass strand composite previously loaded in FIG. 7, and in order to fully encapsulate the glass strand matrix or composite within a completed injection molded part.

Figure 15:
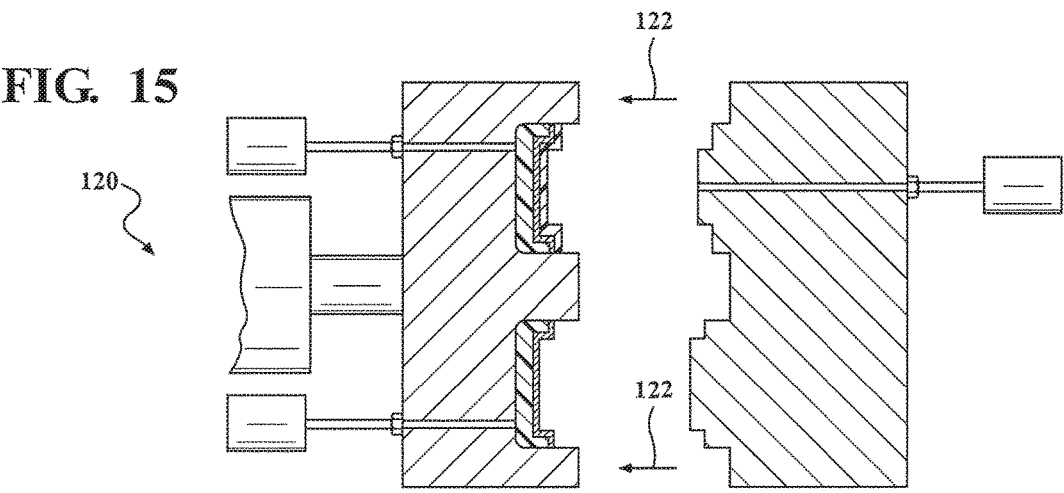
FIG. 15 is a further mold-reopen condition following the dual injection molding operations of FIG. 14, with FIG. 16 further depicting the completed two stage injection molded part being removed from the second mold cavity and the first stage semi-injection molded article being reoriented (FIG. 11) into opposing position with the second cavity mold defining surface of the stationary platen.
Figure 16:
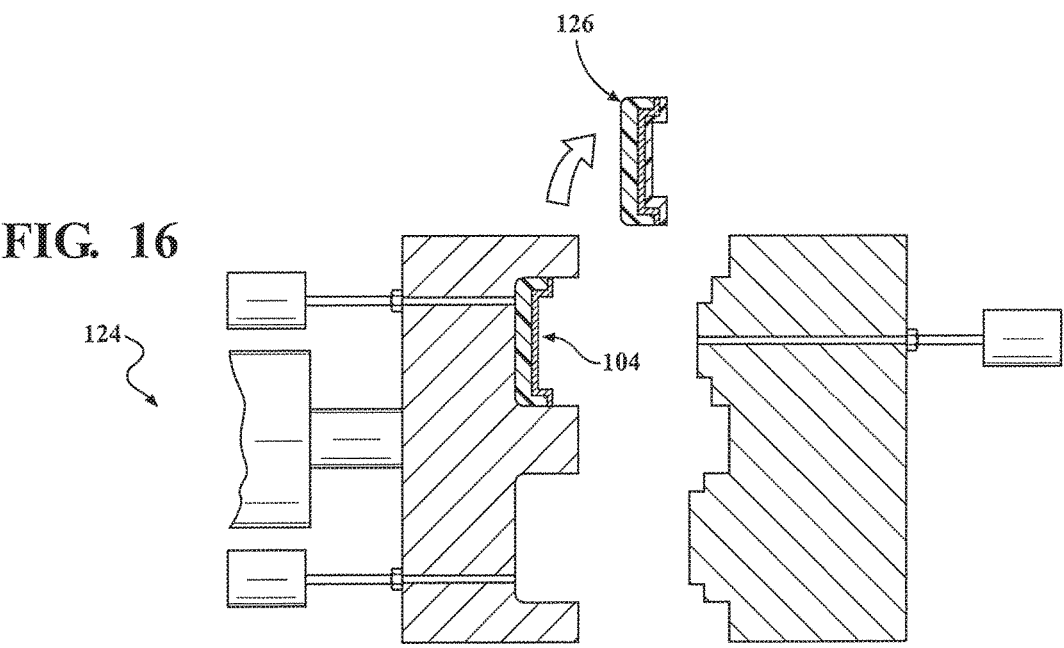

FIG. 15, generally at 120, is a further mold-reopen condition (see retracting arrows 122 representing opening of the moveable platen) following the dual injection molding operations of FIG. 14, with FIG. 16 (generally at 124) further depicting the completed two stage injection molded part, at 126, being removed from the second mold cavity and the subsequently first stage semi-injection molded article, referenced again at 104, being reoriented (FIG. 11) into opposing position with the second cavity mold defining surface of the stationary platen.

FIG. 17 is an illustration, generally at 128, of an example of one non-limiting type of part produced according to the dual stage injection molded assembly and process of the present invention and including such as a PCM (computer) module bracket. FIG. 18 is an end cutaway of the PCM bracket taken along line 18-18 of FIG. 17 and showing the interior arrangement of the oriented and composite glass strand matrix produced according to the dual stage injection molding process.

As best shown in FIG. 18, the bracket includes a pair of outerlayers 130 and 132 which are produced such as according to the two stage injection molding process and assembly of FIGS. 4-16. The glass strand insert, see at 134, is similar to that depicted at in the afore mentioned process such that the resultant article exhibits a thin profile (such as which can be several mils in thickness) while providing adequate rigidity. The article 128 produced can also include any arrangement of mounting features 136 and 138 such as defined along opposite extending edges for facilitating the mounting of the bracket within a given environment.

Figure 19:
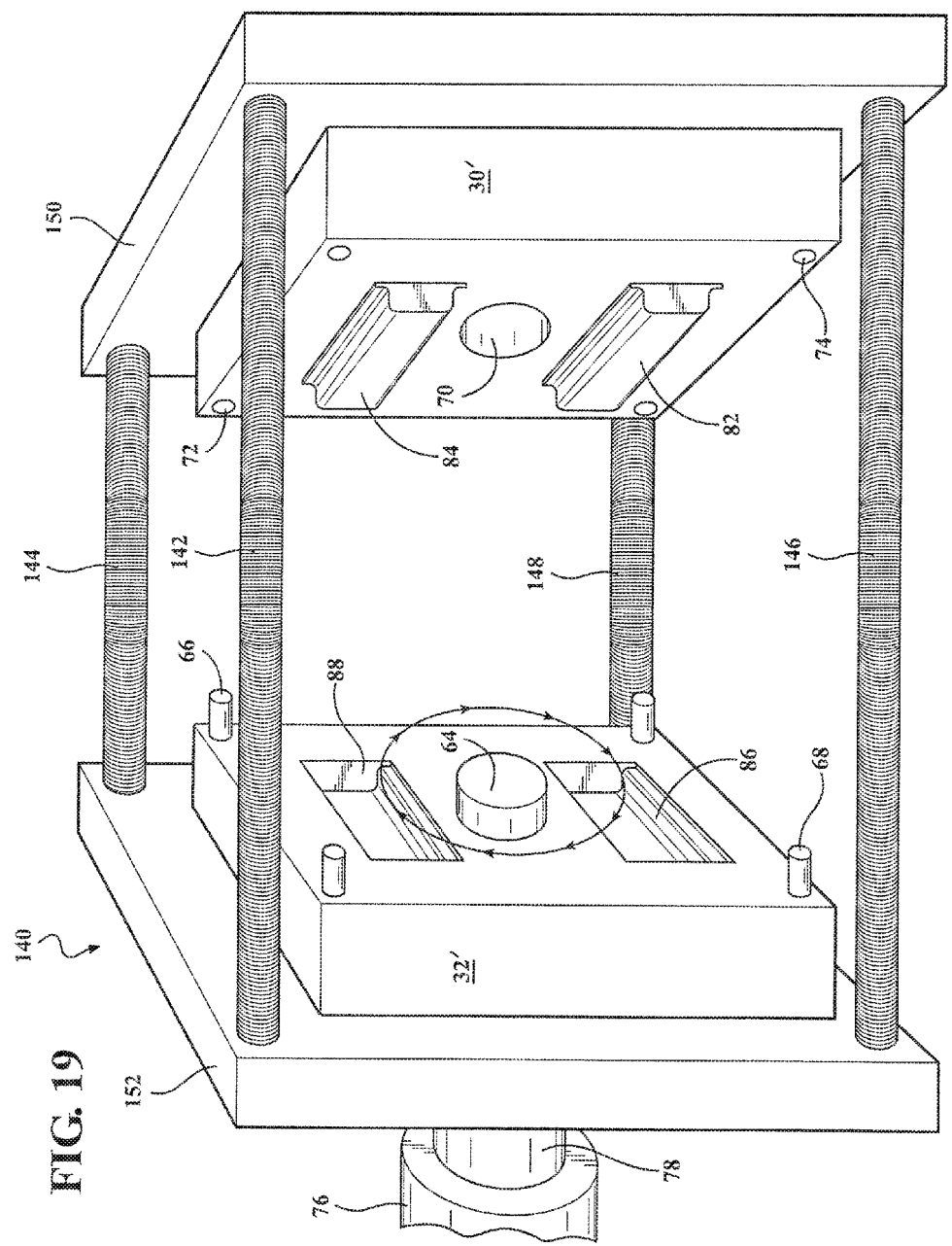
FIG. 19 is a perspective of a rotary press assembly incorporated into the dual stage injection molding operation.

Finally, FIG. 19 is a perspective of a rotary press assembly 140 incorporated into the dual stage injection molding operation and consistent with that previously described. A plurality of powered drive screws top 142/144 and bottom 146/148 are provided and extend through interiorly threaded channels associated with support bases 150 and 152 of the stationary 30' and movable 32' platens in this manner, the drive screws are collectively activated to advance or retract the movable platen in the manner previously described in and out of engaging contact with the opposing cavity defining surfaces of the stationary platen. As further depicted, the central supported platen 32' is rotatable in the manner previously described by rotation of the shaft 78.

Without limitation, the meld process and assembly can be reconfigured so that the first and second injection molding steps can occur simultaneously (or nearly simultaneously) and, upon removal from the mold, the inserted matrix conforms the cavity profile and geometry while creating a cohesive or adhesive bond to the injected thermoplastic. In this fashion, a much lighter and more rigid part is accomplished as compared to prior art methods and articles which seek to produce a similar part using random (chopped) fiber strands within the matrix. This is due to the oriented stand fibers encapsulated and impregnated with the thermoplastic resin in order to produce a steel-like tensile strength at reduced weight and cost.

Additional variants include integrating either single or two stage injection molding operations as described above in use with the oriented glass strand matrix, such further contemplating use of rotary die slide or other transfer mechanisms for efficiently repositioning the mold between successive injection molding operations. The present inventions further envision reconfigurations to the mold cavity configurations of the opposing mold halves which are outside of that depicted and which can include greater pluralities of opposing pairs of mold patterns for scaling upward the number of injection molded articles which can be produced. Such can also envision different assemblies for loading and unloading the mold halves outside of that shown as well as different techniques for injection molding or otherwise introducing the volumes of plasticized materials which can also envisioned compression molding techniques which accomplish similar results in the creation of glass mat integrated articles.

Beyond that depicted, other systems and processes are envisioned which can integrate the elongated and oriented glass strands (according to any weave or density) and in order to produce very lightweight (including but not limited to thin) plasticized articles exhibiting superior tensile, bending and/or torsional strength resistant properties. Having described my invention, other and additional embodiments will become apparent to those skilled in the art to which it pertains, and without deviating from the scope of the appended claims.

I claim:

1. A process for producing a plasticized article, said process comprising the steps of:
    providing a mold cavity to include a first stationary and platen supported mold half and a second opposing and movable platen supported mold half;
    configuring each of the mold halves with a pair of opposing cavity defining surfaces which, upon closing, define first and second cavities;
    providing a previously formed planar sheet constructed of a plurality of elongated glass strands and placing the sheet within a first of the cavity defining surfaces of the first stationary platen prior to closing of the mold halves in order to conform the planar sheet to the first cavity defining surface;
    injecting a first volume of a thermoplastic material through the movable platen supported mold half and into the first cavity in order to fill the first cavity and to imbed and partially encapsulate an exposed surface of the planar sheet of glass strands;
    reopening the mold halves so as to cause the partially encapsulated glass strands to be retained against the movable platen supported mold half;
    rotating the movable platen supported mold half into communication with the second cavity defining surface in the stationary mold half; and
    reclosing the mold halves and subsequently injecting a second volume of thermoplastic material through the stationary platen supported mold half into the second cavity in order to fill an additional volume within the second cavity and to completely encapsulate the planar sheet of glass strands to create the article.

2. The process as described in claim 1, further comprising the step of arranging a further previously formed planar sheet containing a plurality of elongated glass strands within a repositioned first cavity surface of the movable platen, following the step of opening the mold halves after the first injection of material and prior to rotating the movable mold half.

3. The process as described in claim 1, further comprising the step of pre-coating or pre-encapsulating the previously formed sheet containing the plurality of elongated glass strands prior to placing into the first cavity surface of the stationary platen and prior to the first injection of material.

* * * * *